United States Patent [19]
Clark et al.

[11] 3,778,245
[45] Dec. 11, 1973

[54] METHOD AND APPARATUS FOR HEAT TREATING GLASSWARE

[75] Inventors: Willard Clark, Farmland; Charles Campbell, Muncie, both of Ind.

[73] Assignee: Maul Bros., Inc., Millville, N.J.

[22] Filed: Dec. 22, 1970

[21] Appl. No.: 100,636

[52] U.S. Cl......................... 65/119, 65/350, 65/351
[51] Int. Cl.............................................. C03b 25/04
[58] Field of Search..................... 65/118, 119, 350, 65/351

[56] References Cited
UNITED STATES PATENTS
1,837,311   12/1931   Amsler.................................. 65/119

*Primary Examiner*—Arthur D. Kellogg
*Attorney*—Seidel, Gonda & Goldhammer

[57] ABSTRACT

A heat treating lehr is disclosed wherein glassware is heated, annealed, precooled, and then cooled in that order. Precooling is done in a zone of the lehr having a vertical air curtain which prevents temperature drift due to air currents from the cooling zone flowing to the annealing zone.

12 Claims, 7 Drawing Figures

INVENTORS
WILLARD CLARK
CHARLES CAMPBELL
BY

ATTORNEYS

INVENTORS
WILLARD CLARK
CHARLES CAMPBELL
BY
Seidel, Gonda & Goldhammer
ATTORNEYS

METHOD AND APPARATUS FOR HEAT TREATING GLASSWARE

Lehrs for heating glassware are known. For example, see U. S. Pat. No. 1,974,058. Precooling of the anneled glassware to a temperature below the strain point is desirable to prevent cracking of the glassware during the cooling stage. There is a significant problem particularly with glassware of non-uniform wall thickness such as the handle portion of one gallon jugs. This problem becomes more severe with the high production rates presently demanded by the industry.

In accordance with the present invention, precooling is attained in a zone of the lehr wherein there is provided a vertical curtain of pressurized air whose temperature gradually decreases in the direction of glassware travel and through which the glassware must pass while supported on a mesh conveyor belt. The temperature of the air current is controlled so that the temperature of the glass is gradually reduced below the strain point. Virtually no drift occurs since the air curtain is between the cooling zone and the annealing zone.

Some of the air from the vertical air curtain is permitted to immediately recycle with pressurized ambient air and is then directed to discharge ports below the conveyor belt. The remainder of the air from the air curtain is directed through outlets in a roof manifold system to the annealing zone end or upstream end of the precooling zone. The air in the roof manifold system absorbs heat from the roof in the juxtaposed roof portion of the lehr.

The principal object of the present invention is to provide novel apparatus and method for precooling glassware in a lehr.

Another object of the present invention is to provide novel apparatus and method for controlling heat drift between the cooling zone and the annealing zone of the lehr.

Another object of the present invention is to provide novel method and apparatus for precooling glassware and a belt supporting the same by means of an upwardly directed air curtain issuing from the belt support.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
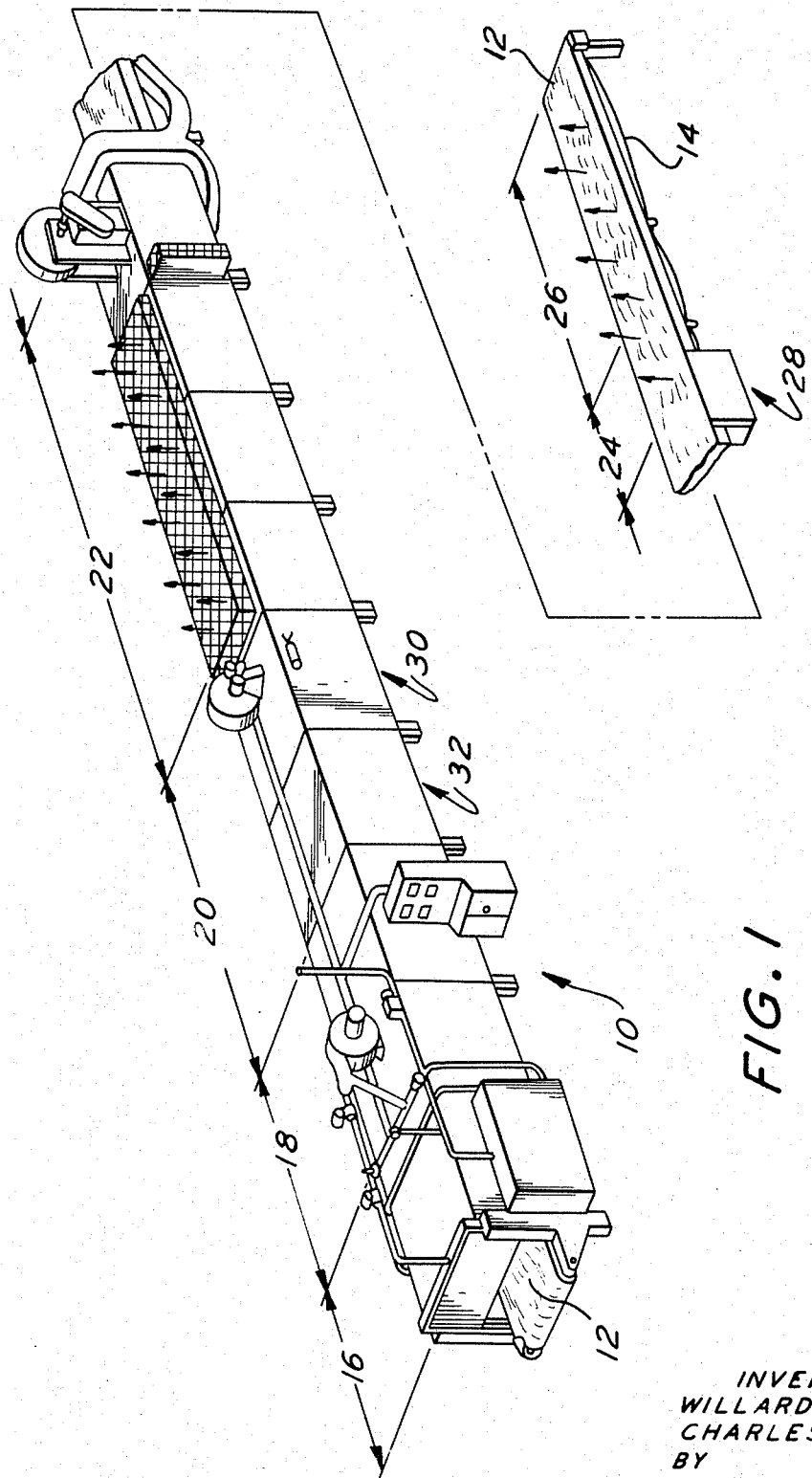
FIG. 1 is a diagrammatic perspective view of a lehr in accordance with the present invention.

Referring to the drawing in detail, wherein like numerals indicate like elements, there is shown in FIG. 1 a diagrammatic illustration of a lehr in accordance with the present invention designated generally as 10. The lehr 10 includes an open mesh metallic conveyor belt for supporting articles to be heat-treated such as glassware 13 as the glassware is moved through the lehr 10.

The conveyor belt includes a top run 12 and a bottom run 13. The lehr 10 includes at its upstream end, a heating section 16, an annealing section 18, a precooling section 20, a cooling section 22, a coating section 24, and a packing section 26 in that sequence. Each section constitutes a zone where the glassware is treated or handled.

The conveyor belt is moved through the lehr 10 by means of a drive means designated generally as 28. For the purposes of the present invention, the details of the various sections of the lehr 10 identified above may be of a conventional or commercially available type except for the precooling section 20 and its upstream portion 32. The downstream portion of the precooling section 20 is designated as 30.

Each of the sections of the lehr 10 is constructed in the form of sections or modules whereby they may be preassembled at the factory and installed at the site in the form of sections thereby materially decreasing the installation time.

Figure 2:
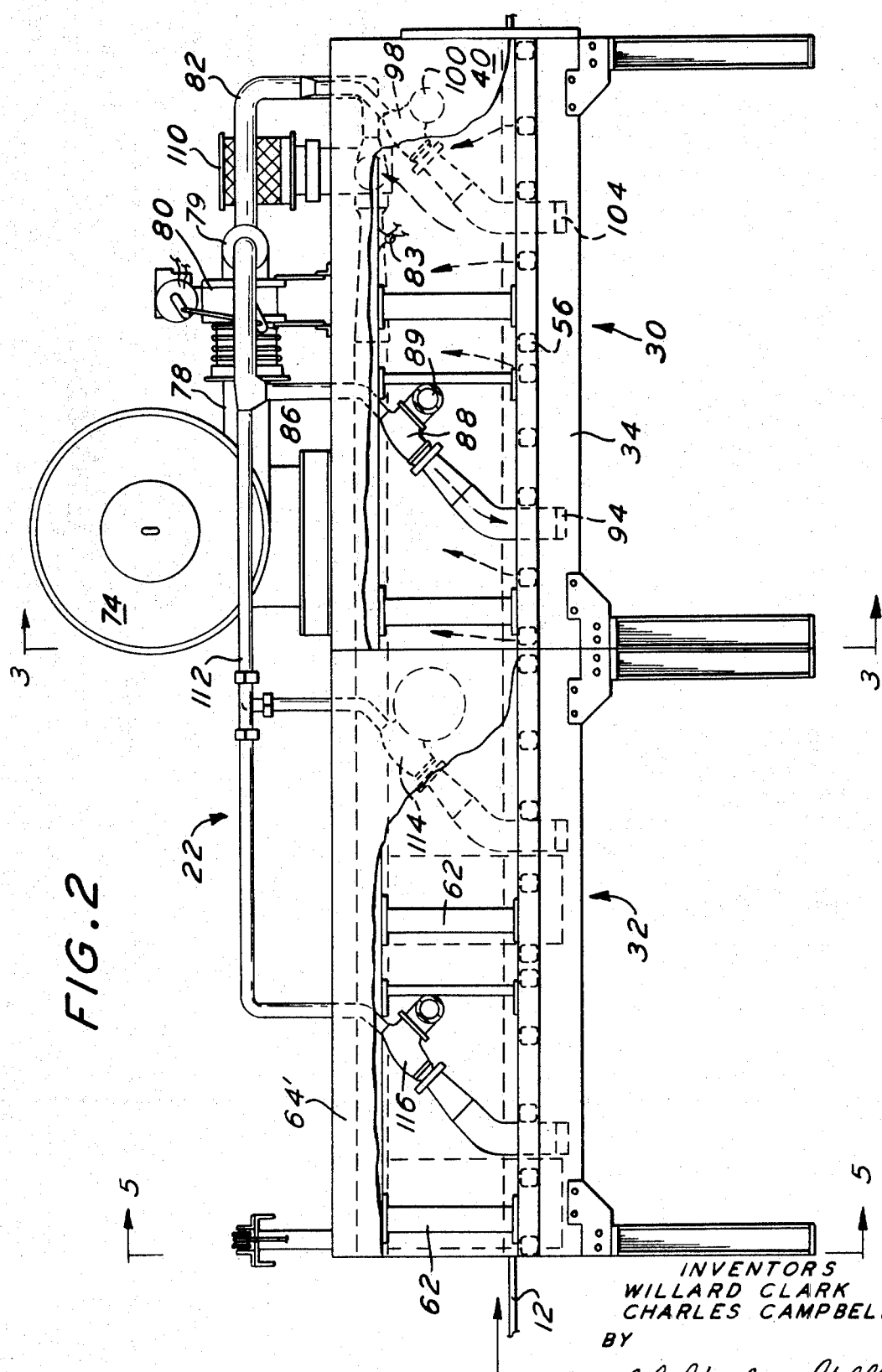
FIG. 2 is a side elevation view, partly broken away, of the precooling section shown in FIG. 1, but on an enlarged scale.
Figure 3:
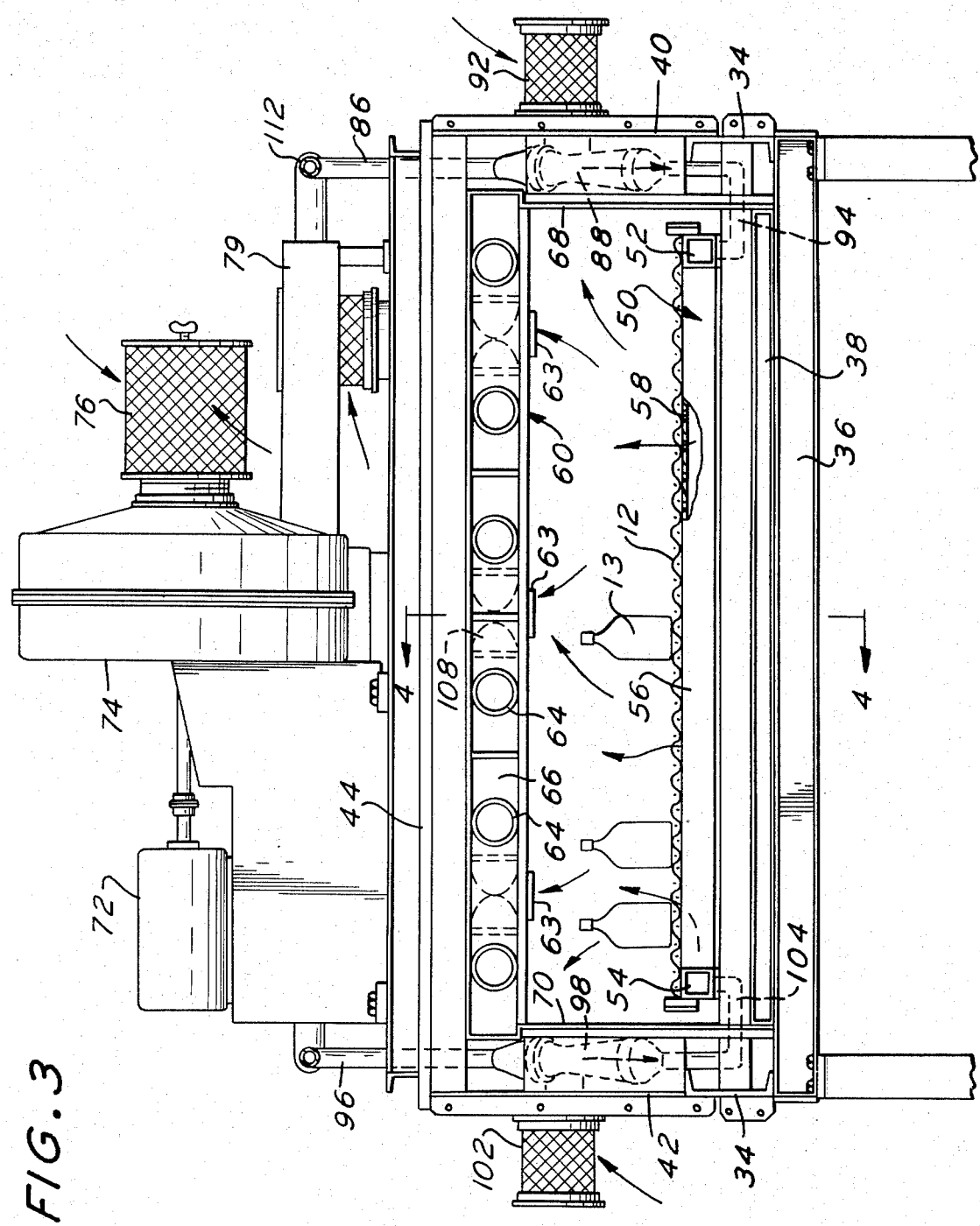
FIG. 3 is a sectional view taken along the line 3—3 in FIG. 2, but on an enlarged scale.

Referring to FIGS. 2 and 3, the downstream portion 30 of the precooling section 20 includes longitudinally extending side frames 34 supported by transverse beams 36. The beams 36 are supported by legs. A bottom wall 38 is provided on top of the beams 36. Side walls 40 and 42 as well as a top wall 44 are provided.

Figure 4:
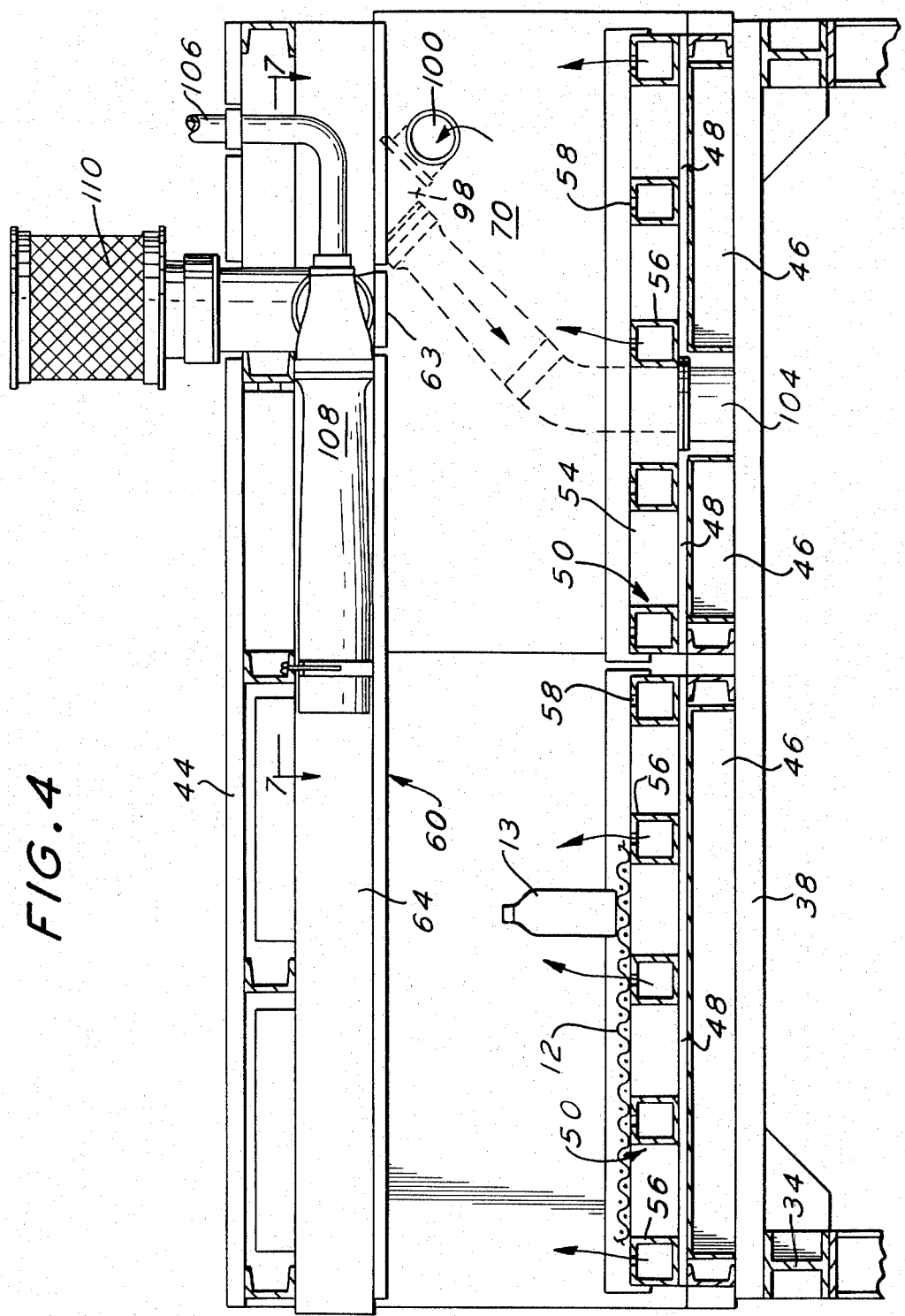
FIG. 4 is a sectional view taken along the line 4—4 in FIG. 3, but on an enlarged scale.

Referring to FIG. 4, insulation boxes 46 are provided on top of the bottom wall 38. Sheet-like spacers 48 are provided on top of the insulation boxes 46. An air curtain manifold discharge means 50 is provided on top of the spacers 48 for supporting the top run 12 of the conveyor belt and discharging a vertical upwardly directed air curtain.

The means 50 includes longitudinally extending side manifolds 50 and 52, see FIG. 3, interconnected by transverse manifold conduits 56. The manifold conduits 56 are provided with air discharge ports 58 at spaced points therealong.

Above the air curtain manifold discharge means 50, there is provided an air curtain receiving or roof manifold system designated generally as 60. The system 60 is supported by vertical columns 62 at spaced points therealong and is provided with inlet ports 63. The system 60 includes longitudinally extending conduits 64 interconnected by transversely extending brace 66 and supported from above by hangers.

Between the longitudinally extending sides of the top run 12 of the conveyor belt and side wall 40, there is provided a partition 68. A similar partition 70 is provided on the opposite side of the top run 12 of the conveyor belt, inwardly from the side wall 42. As will be explained in detail hereinafter, each of the partitions 68 and 70 is provided with a flow passage so that a portion of the air curtain may flow therethrough with the remainder of the air curtain exiting through the ports 63.

A means is provided for creating the pressurized air curtain which discharges upwardly through the ports 58. Such means includes a motor 72 connected to a blower 74 on the roof of the downstream portion 30. The inlet of blower 74 is provided with an air filter 76. The outlet manifold 78, 79 of blower 74 is provided with a motor-operated butterfly valve 80 responsive to temperature sensors 83 adjacent the top of the air curtain. See FIG. 2.

Pressurized ambient air from the outlet manifold 79 flows through conduit 82 to a venturi means such as eductor 88. Pressurized air also flows from manifold 79 through conduit 76 to a similar eductor 98 which is staggered with respect to eductor 84 and on the opposite side of the air curtain.

The eductor 88 is located between the partition 68 and side wall 40 and communicates with the manifold 52 at the upstream end of means 50 by way of elbow 94. Heated air from the air curtain may enter the eductor 88 by way of a flow passage in the partition 68 which communicates with elbow 89. Also, ambient air may enter elbow 89 by way of air filter 92.

Referring to FIGS. 3 and 4, pressurized air from the outlet manifold 79 flows through conduit 96 to eductor 98. Eductor 98 is located between the partition 70 and the side wall 42. Eductor 98 communicates with the manifold 54 at the downstream end of means 50 by way of elbow 104. If desired, the upstream end of means 50 may be separate from the downstream end as shown in FIG. 4. Eductor 98 is provided with an elbow communicating with the air curtain by way of passage 100 in partition 70. Also, ambient air may enter the eductor 98 through air filter 102.

Pressurized air from the manifold 79 flows through conduit 106 to an eductor 108 forming a part of the system 60. System 60 includes a plurality of pairs of parallel eductors 108, each pair communicating with one of the ports 63. Also, each eductor 108 is provided with ambient air through a filter 110. Each eductor 108 has its outlet communicating with one of the longitudinally extending conduits 64. The flow of air through conduits 64 and 64' cools the roof of portions 30 and 32 of section 22.

The upstream portion 32 is substantially identical with the downstream portion 34 as pertains to the provision of an air curtain manifold discharge means designated as 50' and corresponding to means 50. Thus, pressurized air from the blower 74 flows through conduit 112 and is delivered to each of the eductors 114 and 116, which operate in the same manner as eductors 98 and 88, respectively.

Figure 6:
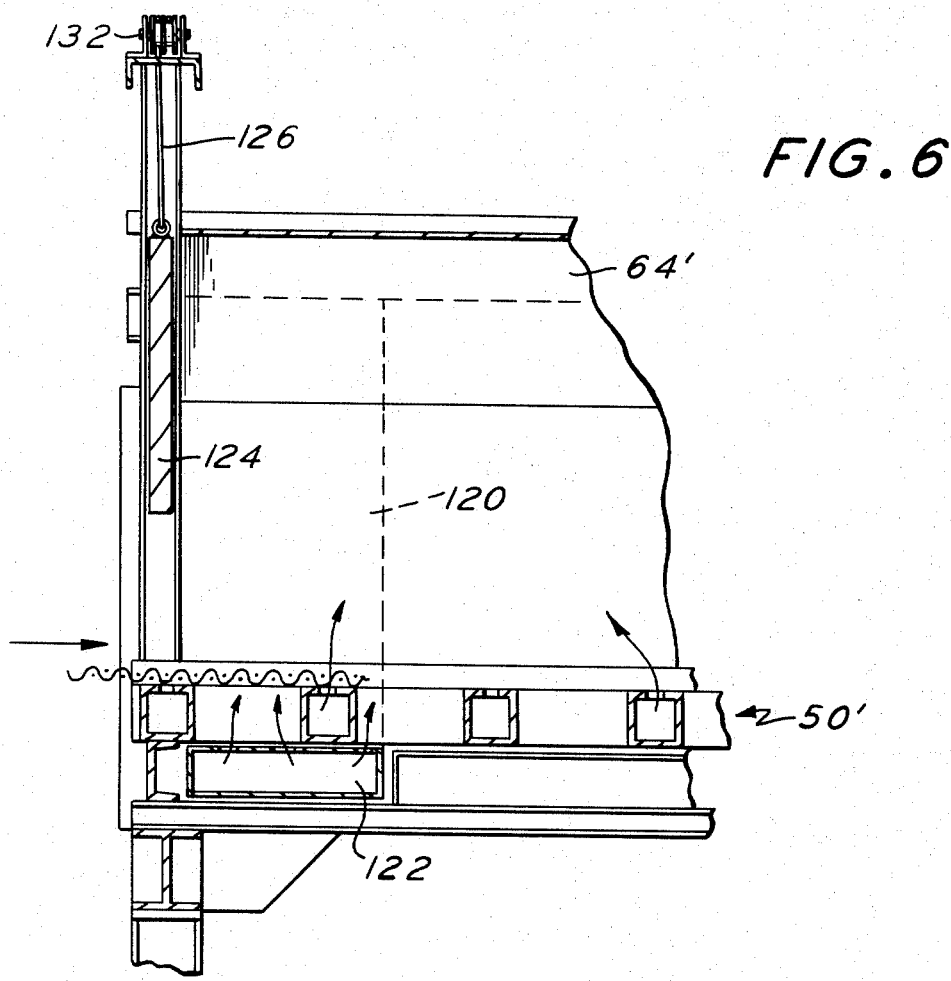
FIG. 6 is a sectional view taken along the line 6—6 in FIG. 5.
Figure 7:
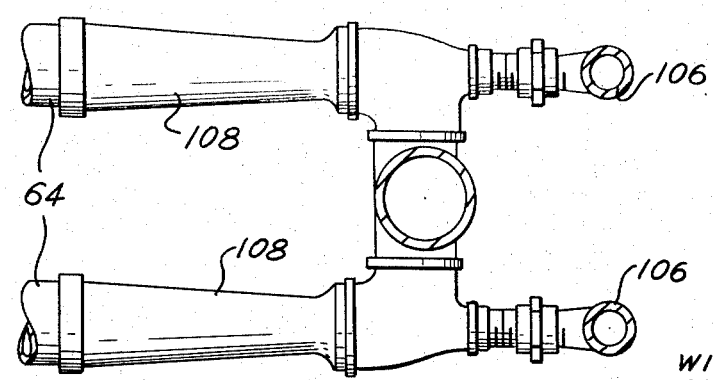
FIG. 7 is a sectional view taken along the line 7—7 in FIG. 4.

The cooling air flowing through the conduits 64 communicates with conduits 64' on the portion 32. The lefthand end or upstream end of conduits 64' communicates with downwardly extending manifolds 120 which communicates with a manifold 122 below means 50'. The manifold 122 does not recycle the air into the means 50' but discharges it upwardly in the tunnel as indicated in FIG. 6. While the air curtain in portion 32 may be recycled in part into the eductors 114 and 116, there are no inlets directly to the conduits 64' of the roof manifold system corresponding to inlet ports 63.

Figure 5:
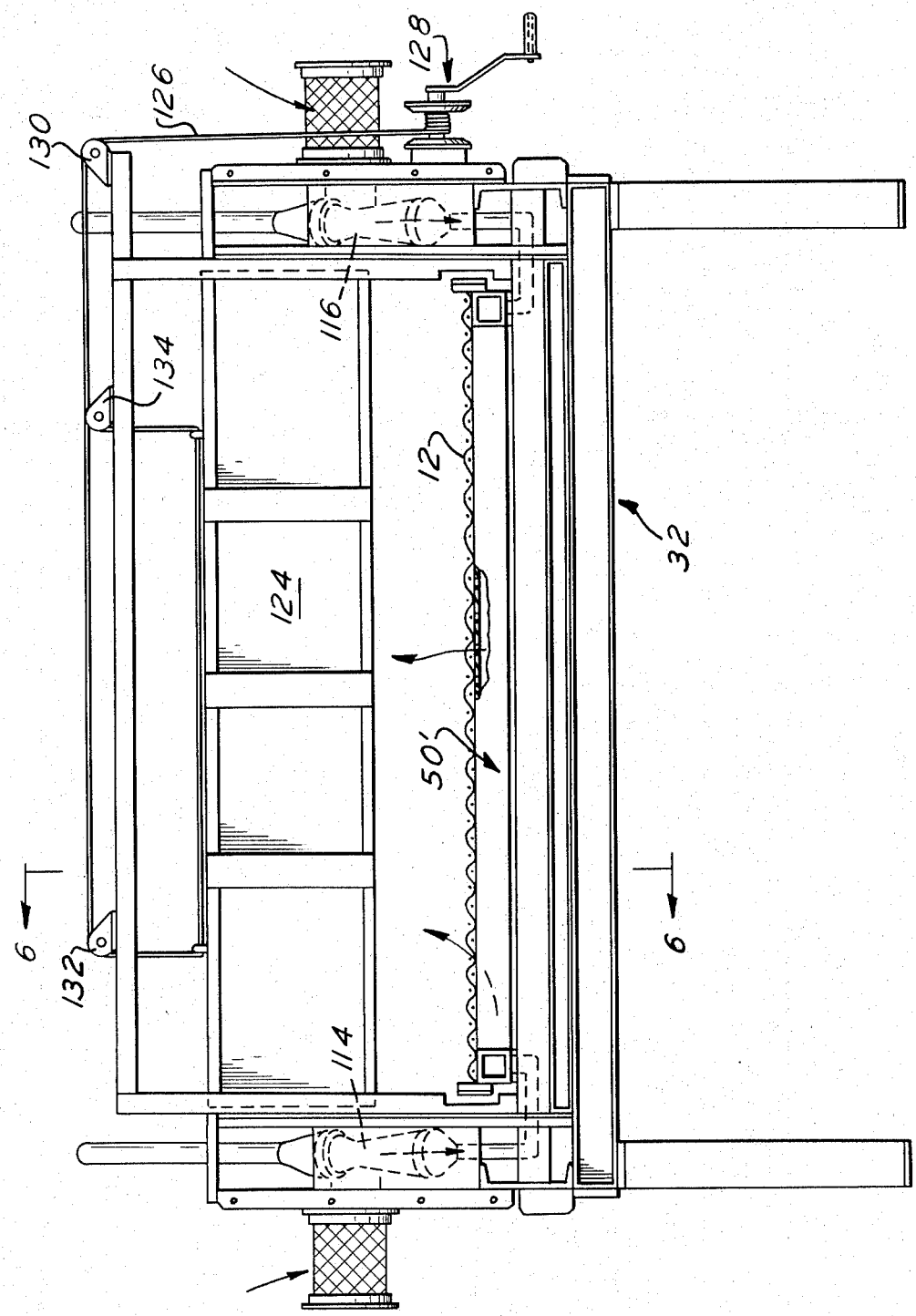
FIG. 5 is a view taken along the line 5—5 in FIG. 2, but on an enlarged scale.

A vertically reciprocable door or gate valve 124 is provided at the upstream end of portion 32. The vertical position of door 124 is selectively adjustable so as to be slightly higher than the tallest of the glassware 13 being processed at the particular time involved. In order to raise or lower door 124, a cable 126 has one end secured to and wound around a drum 128. See FIG. 5. The cable 126 extends over pulleys 130 and 132, downwardly through loops on the door 124, and then is secured to a bracket 134. Rotation of the drum 128, mechanically or manually, will raise or lower the door 124.

The air curtains in portions 30 and 32 prevent drift of the cold cooling air from section 22 from flowing toward the annealing section 18. By throttling the air supply to section 20, and the proper mixing of air in the eductors of portion 30, the air is heated as it passes upwardly at a pressure of about 15–20 inches $H_2O$, through the belt and in contact with the glassware whereby the temperature of the air curtain in portion 30 may be maintained in the range of approximately 850° to 950° F. This temperature is sensed by the temperature sensors 83 which in turn control operation of the motor which controls valve 80. As the temperature of the air curtain increases, valve 80 is opened wider and vice versa.

As the glassware 13 proceeds through the precooling section 20, its temperature is reduced by convection due to the air curtain from the annealing temperature in section 18 down to below its strain point whereby it may be subjected to forced cooling using ambient air as it passes through section 22. As the glassware exits from section 22, a coating may be applied thereto in section 24. The glassware 13 is removed from the top run of the conveyor belt 12 at section 26 and packed into boxes. Cooling fans may be provided below section 26 to be certain that the glassware is cool enough so that it may be touched by human hands.

The present invention may be embodied in other specific forms without departing from the spirit or essential attributes thereof and, accordingly, reference should be made to the appended claims, rather than to the foregoing specification as indicating the scope of the invention.

We claim:

1. A method of heat treating glasseware comprising the steps of precooling said glassware from an annealing temperature to below its strain point before subsequent cooling to ambient temperature, said precooling step including discharging a vertical curtain of pressurized air at a temperature above ambient temperature, and below the annealing temperature upwardly from a plurality of discharge ports through a conveyor belt on which the glassware is supported and moved through the lehr, cooling the roof of the lehr by recirculating some of the air from the air current in an upstream direction in confined passages adjacent the roof and subsequently discharging said recirculated air through said ports.

2. A method in accordance with claim 1 wherein said step of recirculating some of the air includes blending some of the air from upper levels of the air curtain with ambient air, and then directing the mixture in said upstream direction.

3. A method in accordance with claim 1 including pumping a mixture of ambient and heated air to said discharge ports located at spaced locations along said precooling section.

4. A method in accordance with claim 1 including locating said conduits at spaced points across the width of the roof of the lehr.

5. A method in accordance with claim 1 including maintaining the temperature of the air curtain at about 850° to 950° F, and maintaining the pressure of said curtain at about 15–20 inches of water.

6. A glass heat treating lehr comprising a heating section, an annealing section, a precooling section and a cooling section in that sequence, said precooling section including chamber means, an endless mesh conveyor belt above said chamber means, said chamber means having air discharge ports for discharging a vertical air curtain to prevent drift of air from said cooling section to said annealing section, air circulation means for cooling the roof of said precooling section including conduits adjacent the lehr roof with said conduits having an inlet port near the downstream end of said precooling zone between the side walls of the lehr through which air from said curtain may pass and cool the roof as the air moves upstream through said conduit.

7. Apparatus in accordance with claim 6 wherein said air circulation means includes pump means for directing ambient air to said chamber means and including a venturi for introducing heated air from said air curtain for mixing with the ambient air before the mixture is introduced into the chamber means.

8. Apparatus in accordance with claim 6 wherein said chamber means includes rows of parallel transverse conduits having said air discharge ports on their upper surface.

9. Apparatus in accordance with claim 6 wherein said air circulation means includes longitudinally extending conduits adjacent the roof, and a venturi coupled to the inlet of each roof conduit and having a suction port communicating with the space above the chamber means so that a portion of the air curtain is sucked into the venturi.

10. A precooling lehr section for use between the annealing section and the cooling section of a lehr comprising walls defining a tunnel through which glassware may be moved while supported by an open mesh type belt, conduit means in said tunnel below the elevation for the belt, said conduit means having ports for discharging an upwardly directed air curtain along a substantial length of said tunnel to cool glassware below its strain point, means including a confined passage adjacent the roof of said tunnel for withdrawing a portion of the air curtain at spaced points across the width of the tunnel and for recirculating the portion of the withdrawn air curtain upstream to cool the roof of the tunnel, and said passage communicating with said conduit means for subsequent discharge of recirculated air through said ports.

11. A precooling lehr section in accordance with claim 10 wherein said last-mentioned means includes a pump for mixing ambient air with a portion of the air curtain and for directing the air mixture upstream through said passage.

12. A precooling lehr section in accordance with claim 10 wherein said conduit means includes parallel transverse conduits having air discharge ports on their top surface.

* * * * *